US012698657B2

(12) United States Patent
Prakash et al.

(10) Patent No.: US 12,698,657 B2
(45) Date of Patent: Aug. 4, 2026

(54) LOCK MECHANISM OF TELESCOPIC HOLD OPEN ROD

(71) Applicant: CROMPTON TECHNOLOGY GROUP LIMITED, Oxfordshire (GB)

(72) Inventors: Divya Prakash, Bangalore (IN); Sanjay Venugopal, Hassan (IN); Ashib Mohammed Ashruf, Bangalore (IN)

(73) Assignee: CROMPTON TECHNOLOGY GROUP LIMITED, Oxfordshire (GB)

( * ) Notice: Subject to any disclaimer, the term of this patent is extended or adjusted under 35 U.S.C. 154(b) by 186 days.

(21) Appl. No.: 18/487,589

(22) Filed: Oct. 16, 2023

(65) Prior Publication Data

US 2025/0067096 A1 Feb. 27, 2025

(30) Foreign Application Priority Data

Aug. 21, 2023 (IN) .............................. 202311055964

(51) Int. Cl.
| | |
|---|---|
| *E05C 17/30* | (2006.01) |
| *B64D 29/06* | (2006.01) |
| *F16B 7/10* | (2006.01) |

(52) U.S. Cl.
CPC .............. *E05C 17/30* (2013.01); *B64D 29/06* (2013.01); *F16B 7/105* (2013.01)

(58) Field of Classification Search
CPC ......... E05C 17/30; B64D 29/06; F16B 7/105; F15B 15/261
USPC ......... 248/688, 351, 354.1, 295.11; 292/262, 292/338
See application file for complete search history.

(56) References Cited

U.S. PATENT DOCUMENTS

| | | | | | |
|---|---|---|---|---|---|
| 5,842,255 | A | * | 12/1998 | Luca ....................... | E05C 17/30 16/49 |
| 6,334,730 | B1 | * | 1/2002 | Porte ..................... | B64D 29/08 403/322.2 |
| 6,553,799 | B2 | | 4/2003 | Bates et al. | |
| 7,654,371 | B1 | * | 2/2010 | Metz ........................ | F16F 9/56 188/300 |

(Continued)

FOREIGN PATENT DOCUMENTS

| | | |
|---|---|---|
| WO | 2014071270 A1 | 5/2014 |
| WO | 2015143217 A1 | 9/2015 |

(Continued)

OTHER PUBLICATIONS

Extended European Search Report for EP Application No. 24192055. 2, dated Jan. 23, 2025, pp. 1-9.

*Primary Examiner* — Anita M King
(74) *Attorney, Agent, or Firm* — CANTOR COLBURN LLP

(57) ABSTRACT

A door and hold open rod assembly of an aircraft includes a door, and a hold open rod assembly secured to the door. The hold open rod assembly is configured to support the door in an opened position when the hold open rod is deployed. The hold open rod assembly includes a first rod segment extending along a rod central axis, a second rod segment surrounding the first rod segment and in a telescoping arrangement with the first rod segment, and a locking apparatus operably connected to the first rod segment and the second rod segment, the locking apparatus configured to automatically lock the first rod segment in an extended position relative to the second rod segment.

15 Claims, 6 Drawing Sheets

(56) References Cited

U.S. PATENT DOCUMENTS

| | | |
|---|---|---|
| 8,998,165 B2 | 4/2015 | Wheeler et al. |
| 9,464,645 B2 | 10/2016 | Dyer et al. |
| 10,670,063 B2 | 6/2020 | Artin |
| 11,053,717 B2 | 7/2021 | Artin |
| 11,512,665 B2 | 11/2022 | Miao |
| 2013/0146736 A1 | 6/2013 | Wheeler et al. |
| 2015/0267724 A1* | 9/2015 | Dyer .................... F15B 15/261 |
| | | 92/15 |
| 2018/0223572 A1* | 8/2018 | Artin ....................... E05C 17/08 |
| 2019/0032377 A1* | 1/2019 | Dyer ...................... F16F 7/085 |
| 2024/0409227 A1* | 12/2024 | Venugopal ............. E05C 17/30 |

FOREIGN PATENT DOCUMENTS

| | | | |
|---|---|---|---|
| WO | 2018203946 A1 | 11/2018 | |
| WO | 2019028005 A1 | 2/2019 | |

* cited by examiner

LOCK MECHANISM OF TELESCOPIC HOLD OPEN ROD

BACKGROUND

Exemplary embodiments pertain to the art of telescopic rods, and more particularly to cowling hold open rods for aircraft.

On typical aircraft, the engines are mounted either under the wing or on the fuselage. The engines are enclosed in cowling to direct airflow along the engine flowpath and to also contain engine components therein. During engine maintenance operations, it may be necessary to access the engine inside the cowling. As such, the cowling components are often hinge mounted and are rotatable to an opened position to allow such engine access for the maintenance personnel. The cowling may utilize a hold open rod which is deployable to the engine to hold the cowling in the opened position. To have a compact stowed volume, while still being able to hold the cowling open to the required angle, the hold open rod includes two or more rod segments which are nested in order to extend in a telescoping motion to the required length. The rod must therefore have automatically engageable and easily disengageable by user operation lock mechanism to prevent unintentional collapse of the extended hold open rod.

BRIEF DESCRIPTION

In one exemplary embodiment, a rod assembly includes a first rod segment extending along a rod central axis, a second rod segment surrounding the first rod segment and in a telescoping arrangement with the first rod segment, and a locking apparatus operably connected to the first rod segment and the second rod segment. The locking apparatus is configured to automatically lock the first rod segment in an extended position relative to the second rod segment.

Additionally or alternatively, in this or other embodiments the locking apparatus includes a cylinder end fitting of the second rod segment surrounding the first rod segment. The cylinder end fitting includes at least one locking groove. At least one lock segment is installed into a segment opening. The at least one lock segment is configured to engage with the at least one locking groove when the first rod segment is moved to the locking position relative to the second rod segment when the unlock sleeve is not covering the locking groove.

Additionally or alternatively, in this or other embodiments the locking apparatus includes an outer sleeve surrounding the cylinder end fitting, and an unlock sleeve located radially inboard of the cylinder end fitting. The unlock sleeve is configured to block the at least one locking groove to prevent engagement of the at least one lock segment into the at least one locking groove unless the first rod segment is in the extended position and the unlock groove is uncovered due to upward movement of unlock sleeve under spring force.

Additionally or alternatively, in this or other embodiments the cylinder end fitting includes at least one ball installed thereto. The ball is selectably engageable into a detent formed in the outer sleeve when the rod assembly is in the unlocked position.

Additionally or alternatively, in this or other embodiments the ball is urged into engagement with the detent via a detent sleeve positioned radially inboard of the unlock sleeve.

Additionally or alternatively, in this or other embodiments the outer sleeve is secured to the unlock sleeve via at least one dowel pin extending through at least one pin slot in the cylinder end fitting.

Additionally or alternatively, in this or other embodiments the at least one lock segment includes a wear resistant insert installed thereto to prevent wear of the second rod segment.

Additionally or alternatively, in this or other embodiments the at least one lock groove includes a dovetail shaped engagement surface at which a complimentary engagement tab of the lock segment is engageable.

In another exemplary embodiment, a door and hold open rod assembly of an aircraft includes a door, and a hold open rod assembly secured to the door. The hold open rod assembly is configured to support the door in an opened position when the hold open rod is deployed. The hold open rod assembly includes a first rod segment extending along a rod central axis, a second rod segment surrounding the first rod segment and in a telescoping arrangement with the first rod segment, and a locking apparatus operably connected to the first rod segment and the second rod segment, the locking apparatus configured to automatically lock the first rod segment in an extended position relative to the second rod segment.

Additionally or alternatively, in this or other embodiments the locking apparatus includes a cylinder end fitting surrounding the first rod segment, the cylinder end fitting including at least one locking groove, and at least one lock segment installed into a lock groove in the lock segment biased toward the at least one locking groove. The at least one lock segment is configured to engage with the at least one locking groove when the first rod segment is moved to the extended position relative to the second rod segment.

Additionally or alternatively, in this or other embodiments the locking apparatus includes an outer sleeve surrounding the cylinder end fitting, and an unlock sleeve positioned radially inboard of the cylinder end fitting. The unlock sleeve is configured to block the at least one locking groove to prevent engagement of the at least one lock segment into the at least one locking groove unless the first rod segment is in the extended position.

Additionally or alternatively, in this or other embodiments the cylinder end fitting includes at least one ball installed thereto. The ball is selectably engageable into a detent formed in the outer sleeve when the rod assembly is in the unlocked position.

Additionally or alternatively, in this or other embodiments the ball is urged into engagement with the detent via a detent sleeve positioned radially inboard of the unlock sleeve.

Additionally or alternatively, in this or other embodiments the outer sleeve is secured to the unlock sleeve via at least one dowel pin extending though at least one pin slot in the cylinder end fitting.

Additionally or alternatively, in this or other embodiments the at least one lock segment includes a wear resistant insert installed thereto to prevent wear of the second rod segment.

Additionally or alternatively, in this or other embodiments the at least one lock groove includes a dovetail shaped engagement surface at which a complimentary engagement tab of the lock segment is engageable.

In another exemplary embodiment, an engine assembly of an aircraft includes an engine body, a cowling configured to at least partially enclose the engine body, the cowling movable between a closed position and an opened position, and a hold open rod assembly secured to the cowling. The hold open rod assembly is configured to support the cowling in an opened position when the hold open rod is deployed.

The hold open rod assembly includes a first rod segment extending along a rod central axis, a second rod segment surrounding the first rod segment and in a telescoping arrangement with the first rod segment, and a locking apparatus operably connected to the first rod segment and the second rod segment. The locking apparatus is configured to automatically lock the first rod segment in an extended position relative to the second rod segment.

Additionally or alternatively, in this or other embodiments the locking apparatus includes a cylinder end fitting surrounding the first rod segment, the cylinder end fitting including at least one locking groove, and at least one lock segment installed into a lock groove in the lock segment biased toward the at least one locking groove. The at least one lock segment is configured to engage with the at least one locking groove when the first rod segment is moved to the extended position relative to the second rod segment.

Additionally or alternatively, in this or other embodiments the locking apparatus includes an outer sleeve surrounding the cylinder end fitting, and an unlock sleeve positioned radially inboard of the cylinder end fitting. The unlock sleeve is configured to block the at least one locking groove to prevent engagement of the at least one lock segment into the at least one locking groove unless the first rod segment is in the extended position.

Additionally or alternatively, in this or other embodiments the cylinder end fitting includes at least one ball installed thereto. The ball is selectably engageable into a detent formed in the outer sleeve when the rod assembly is in the unlocked position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. The present disclosure is described in the context of a hold open rod of a cowling for an aircraft engine, but one skilled in the art will readily appreciate that the present disclosure may be readily applied to other rod and retention applications.

Figure 1:
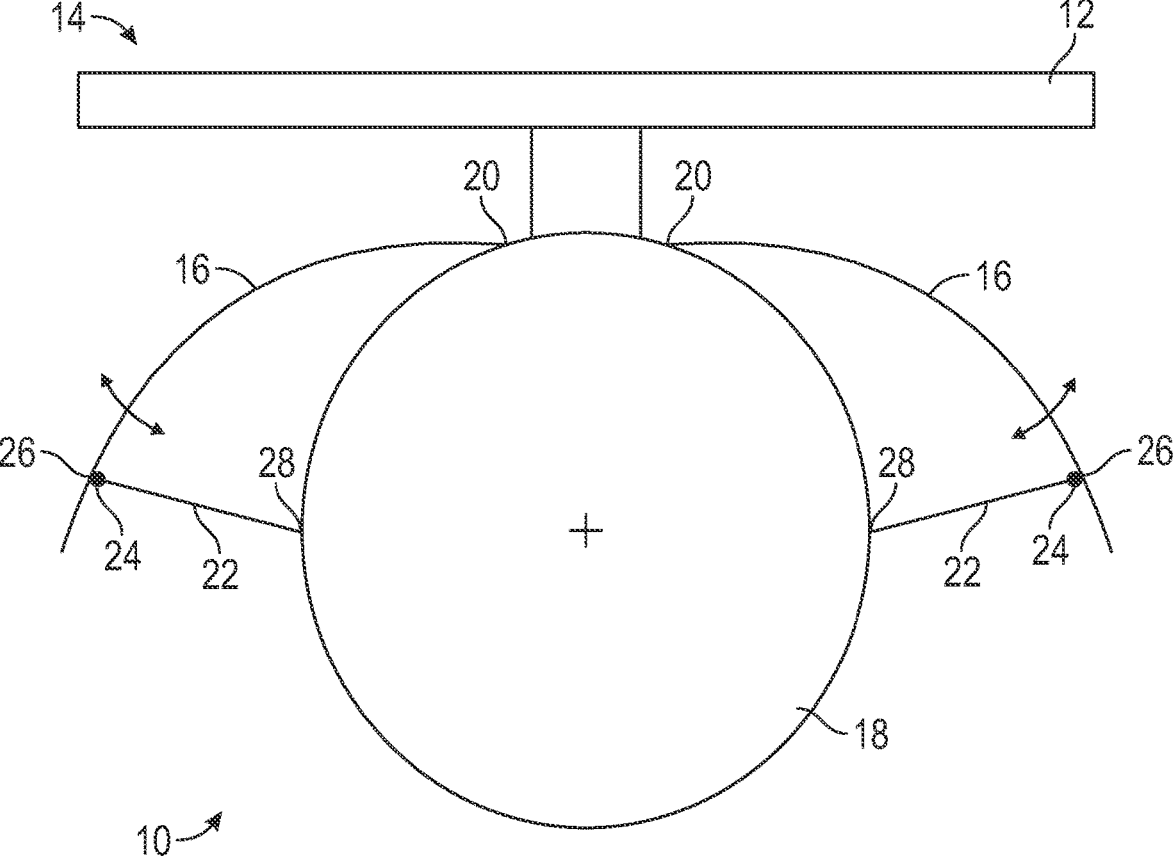
FIG. 1 is a schematic illustration of an aircraft engine and nacelle.

Referring now to FIG. 1, illustrated is an embodiment of an aircraft engine 10 mounted under a wing 12 of an aircraft 14. The engine 10 includes one or more segments of cowling 16 movable between an opened position such as illustrated and a closed position around an engine body 18. The cowling 16 is operably connected to a cowling hinge 20 about which the cowling 16 rotates to move between the opened position and the closed position. To aid in retaining the cowling 16 in the opened position, a hold open rod 22 is connected to each of the cowling 16 and the engine body 18 to prevent closing of the cowling 16 while the hold open rod 22 is engaged. In some embodiments, the hold open rod 22 is secured to the cowling 16 at a first rod end 24 via a rod hinge 26, and when the cowling 16 is in the opened position a second rod end 28 is moved to the engine body 18 and secured to the engine body 18 via, for example a locating pin or other apparatus recognizable to one skilled in the art.

Figure 2:
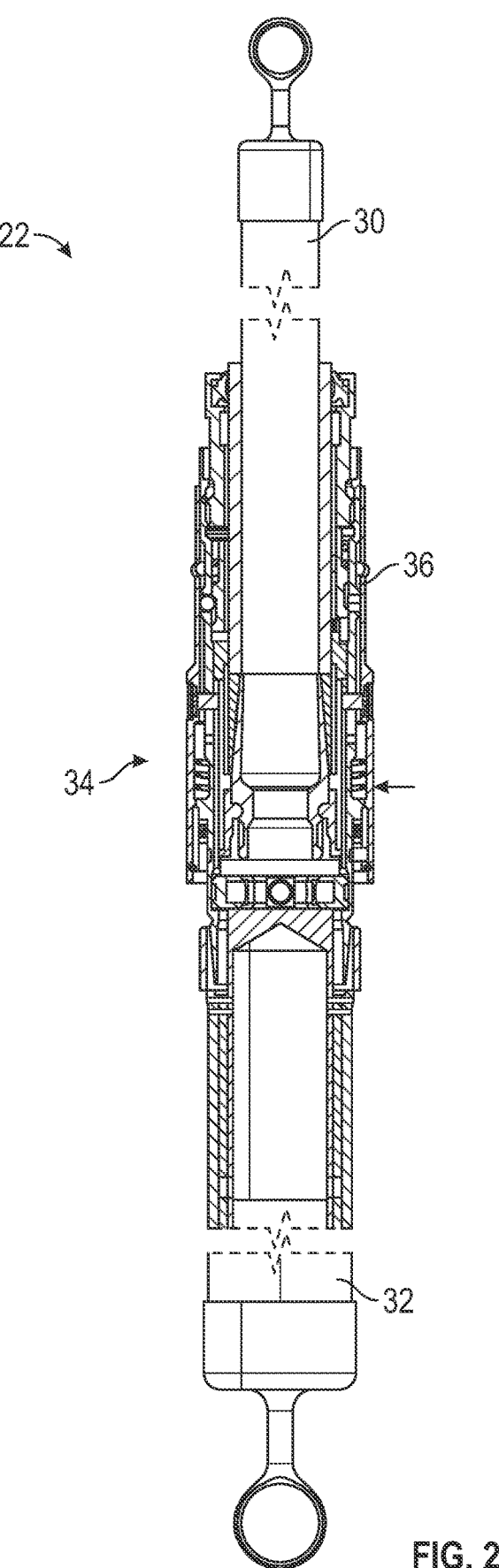
FIG. 2 is a partial cross-sectional view of an embodiment of a hold open rod.

Referring now to FIG. 2, a partial cross-sectional view of a hold open rod 22 is illustrated. The hold open rod 22 is a telescoping configuration, with a first rod segment 30 nested at least partially inside of a second rod segment 32. To achieve this, the first rod segment 30 has an outer diameter less than an inner diameter of the second rod segment 32. In some embodiments the first rod segment 30 is connected to the cowling 16 and the second rod segment is connected to the engine body 18. One skilled in the art, however, will readily appreciate that in other embodiments this arrangement may be reversed, with the first rod segment 30 connected to the engine body 18 and the second rod segment 32 connected to the cowling 16.

The hold open rod 22 further includes a locking apparatus 34 disposed at an interface of the first rod segment 30 and the second rod segment 32, which is configured to lock the hold open rod 22 in an extended position as illustrated in FIG. 1, and allow for unlocking of the hold open rod 22 from the extended position when it is desired to close the cowling 16 around the engine body 18. The locking apparatus 34 is self-locking and automatically engages when the hold open rod 22 reaches the extended position. Further, unlocking of the locking apparatus 34 is not possible when the hold open rod 22 is under load from the cowling 16. Further, unlocking of the locking apparatus 34 is not possible with only a single action.

The locking apparatus 34 includes an outer sleeve 36 that is movable along a rod central axis 38 and rotatable about the rod central axis 38. The outer sleeve 36 is coupled to an unlock sleeve 40 located radially inboard of the outer sleeve 36 by one or more dowel pins 42 extending from the outer sleeve 36 to the unlock sleeve 40. As such, the unlock sleeve 40 moves with the outer sleeve 36 both along the rod central axis 38 and about the rod central axis 38. A cylinder end fitting 44 is an extension of the second rod segment 32, and is located radially between the outer sleeve 36 and the unlock sleeve 40. The outer sleeve 36 is movable along the rod central axis 38 relative to the second rod segment 32, and includes pin slots 46 through which the dowel pins 42 extend. In some embodiments, the pin slots 46 have an L-shape or other axially-elongated shape to allow for relative axial movement of the outer sleeve 36 and the unlock sleeve 40 relative to the cylinder end fitting 44. A ball 48 is located in a ball opening 50 in the cylinder end fitting 44, and is selectably positionable in a ball detent 52 in the outer sleeve 36 to selectable lock the position of the unlock sleeve 40 relative to the cylinder end fitting 44. A spring-loaded detent sleeve 54 is located radially inboard of the cylinder end fitting 44 and retains the ball 48 in the ball opening 50.

The cylinder end fitting 44 further includes a plurality of lock grooves 56 formed therein. The lock grooves 56 are radially inward facing and selectably interact with spring loaded lock segments 58 installed into segment openings 60 formed in the first rod segment 30.

Figure 3:
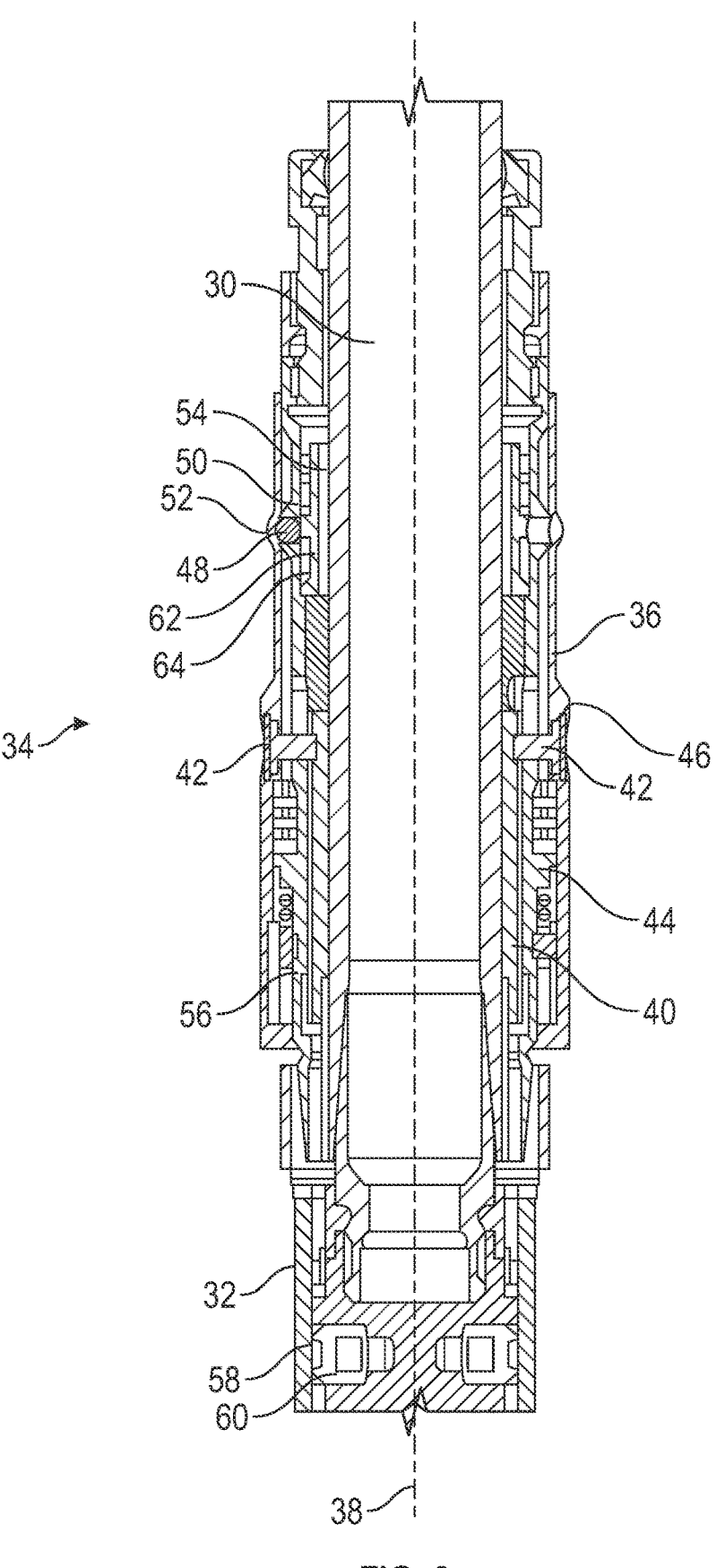
FIG. 3 is a partial cross-sectional view of an embodiment of a hold open rod in an unlocked position.

In the unlocked position, as illustrated in FIG. 3, the ball 48 is urged into the ball detent 52 by a ball tab 62 of the detent sleeve 54. This locks a position of the outer sleeve 36 and thereby also the unlock sleeve 40 relative to the cylinder end fitting 44. In this position, the unlock sleeve 40 covers the lock grooves 56. Additionally, the lock segments 58 are retained in a retracted position in the segment openings 60 by the second rod segment 32.

Figure 4:
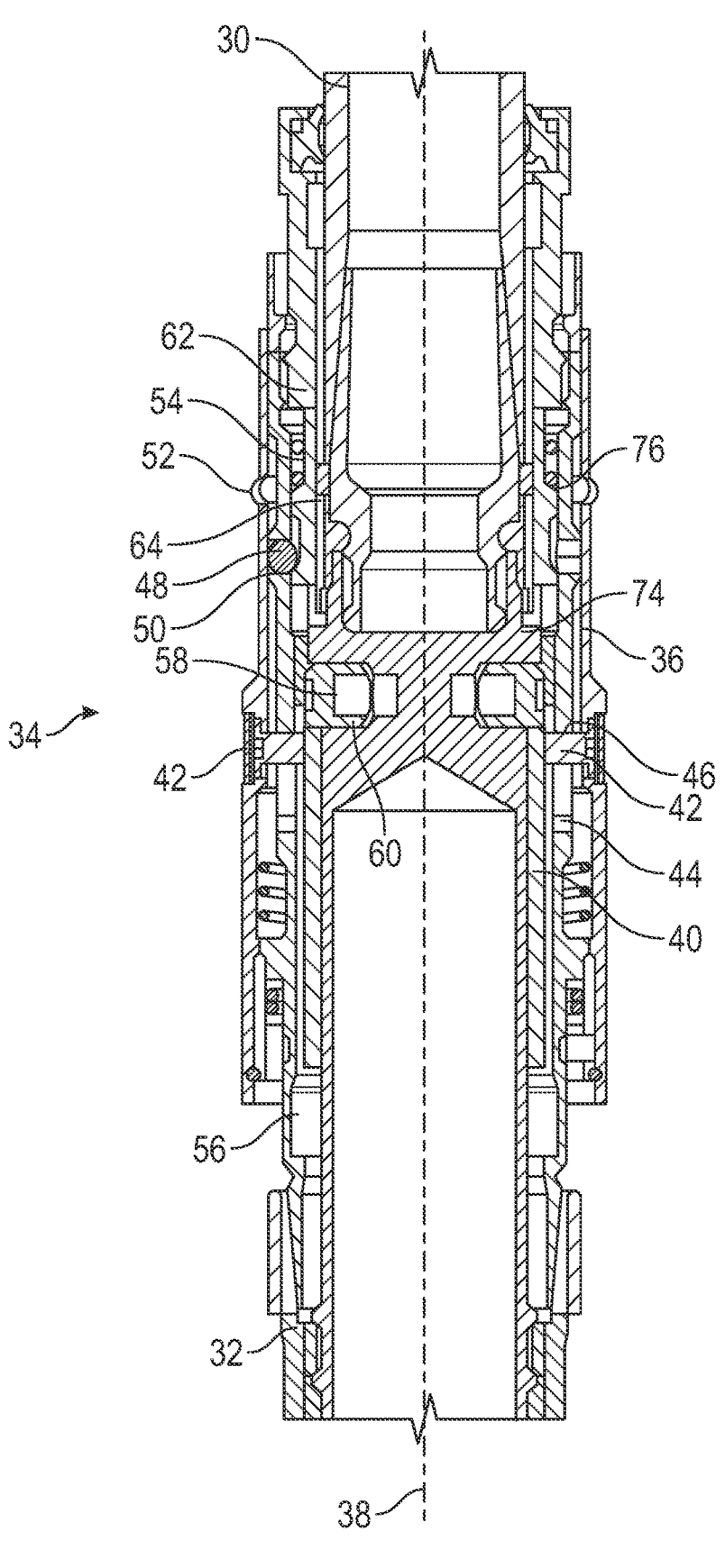
FIG. 4 is a partial cross-sectional view of an embodiment of a hold open rod in a fully extended position.

In FIG. 4, the hold open rod 22 is illustrated in a fully extended position. The extension of the hold open rod 22 moves the lock segments 58 past the lock grooves 56 which are still covered by the unlock sleeve 40. When moved to the fully extended position, the detent sleeve 54 is urged along with the first rod segment 30, being pushed by a first segment head 74 of the first rod segment 30, overcoming a spring force of a detent sleeve spring 76, so that the ball 48 is no longer engaged with the ball detent 52 by the ball tab 62. The ball 48 falls into a detent groove 64 of the detent sleeve 54. As the ball 48 clears the ball detent groove's 52 path for the outer sleeve 36 and the unlock sleeve 40 relative to the cylinder end fitting 44, the travel of the outer sleeve 36 along with the unlock sleeve 40 uncovers the lock grooves 56.

Figure 5:
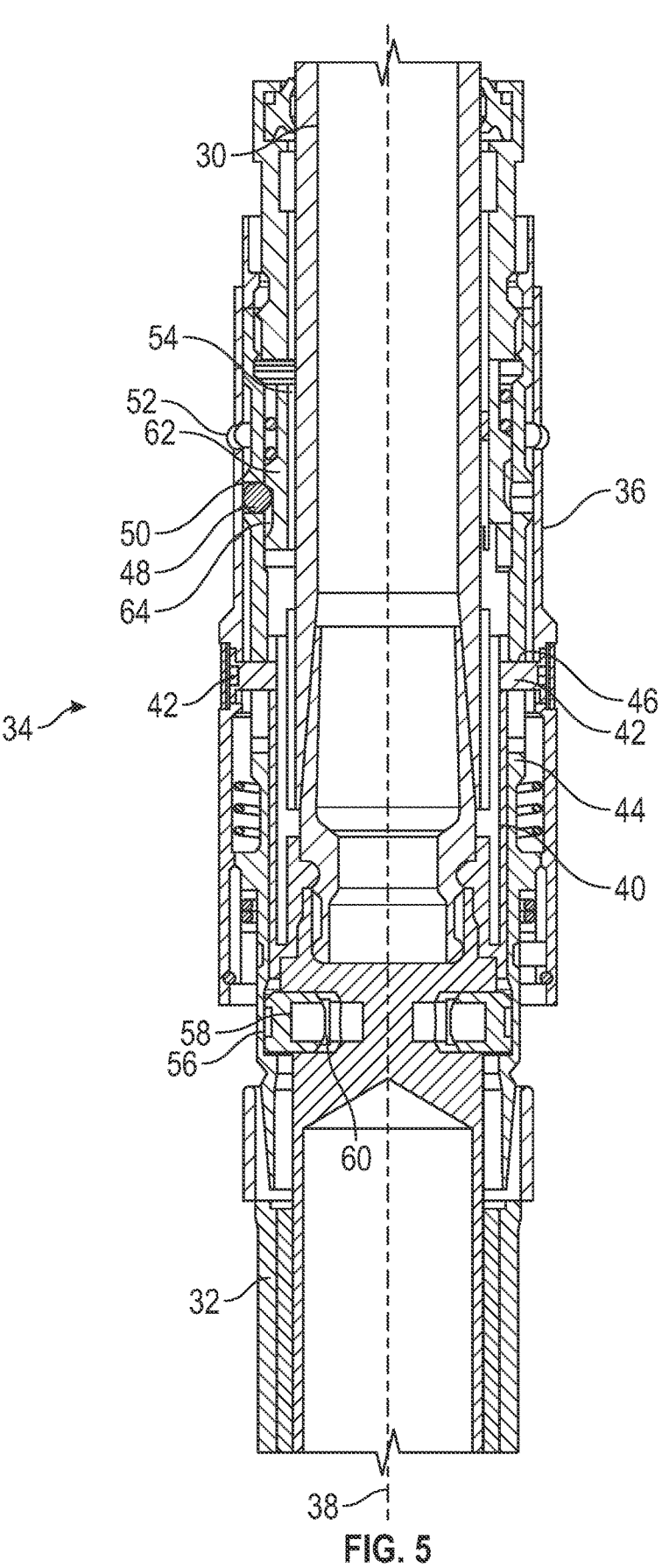
FIG. 5 is a partial cross-sectional view of an embodiment of a hold open rod in a locked position.

From the fully extend position of FIG. 4, the hold open rod 22 is returned or relaxed to the locked position as illustrated in FIG. 5. When moving from the fully extended position to the locked position, the hold open rod 22 retracts slightly, so that the lock segments 58 move to the lock grooves 56 and engage with the lock grooves 56 due to the spring-loaded configuration of the lock segments 58.

Figure 6:
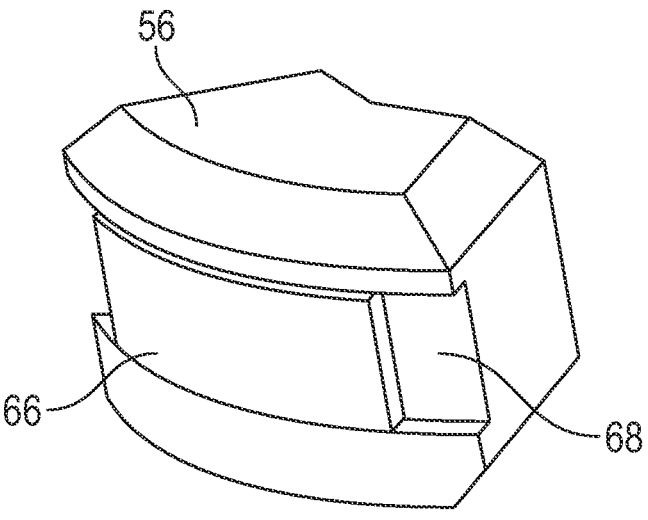
FIG. 6 is a perspective view of an embodiment of a lock segment with a wear-resistant insert.

Referring now to FIG. 6, in some embodiments the lock segments 58 include wear resistant inserts 66, of for example a polyetheretherketone (PEEK) material at a radially outer surface of the lock segments 58. The inserts 66 prevent rubbing of the lock segments 58 on the composite surface of second rod segment 32 as the hold open rod 22 is extended and retracted, thus preventing abrasive wear of the composite surface of second rod segment 32. In some embodiments, to retain the inserts 66 to the lock segments 58, the lock segment 58 includes a dovetail slot 68 into which the insert 66 is installed.

Figure 7:
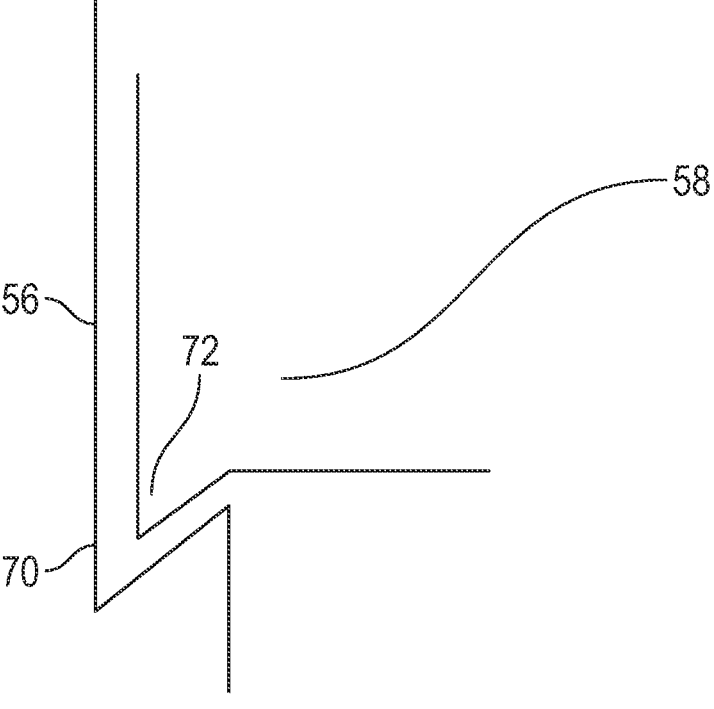
FIG. 7 is a partial cross-sectional view illustrating engagement of a lock segment with a lock groove.

Referring now to FIG. 7, the interface between the lock segment 58 and the lock groove 56 may be configured to retain the lock segment 58 to the lock groove 56 and to prevent the possibility of unlocking of the lock segment 58 therefrom when the hold open rod 22 is loaded. For example, the lock groove 56 may include a dovetail shaped engagement surface 70 at which a complimentary engagement tab 72 of the lock segment 58 is engaged when the hold open rod 22 is in the locked position.

To disengage the hold open rod 22 from the locked position, the hold open rod 22 first needs to be moved to the fully extended position, as shown in FIG. 4. When moved to the fully extended position, the lock segment 58 will retract inside the segment opening 60 due to the wedge top surface of the lock segment 58 and the lower wedge surface of unlock sleeve 40. When in the fully extended position, the user pulls the outer sleeve 36 toward the lock groove 56, which in turn pulls the unlock sleeve 40 downward toward the lock groove 56. Once the ball detent groove 52 of outer sleeve 36 has reached over the ball opening 50, the first rod segment 30 is allowed to retract. As the first rod segment 30 retracts, the ball detent sleeve moves down as a result of the spring force pushing the ball 50 into the detent groove 52 and the tab 62 of the detent sleeve 54 comes in front of the ball opening 50, locking the ball 48 in the detent groove 52. This locks the outer sleeve 36 and the unlock sleeve 40 together in this position as shown in FIG. 5 covering the lock groove 56. Now when the first rod segment 30 is retracting, the lock segments 58 are not able to expand in the covered lock groove 56 and allows the first rod segment 30 to retract in the second rod segment 32.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rod assembly comprising:
a first rod segment extending along a rod central axis;
a second rod segment surrounding the first rod segment and in a telescoping arrangement with the first rod segment; and
a locking apparatus operably connected to the first rod segment and the second rod segment, the locking apparatus configured to automatically lock the first rod segment in an extended position relative to the second rod segment;
wherein the locking apparatus comprises:
a cylinder end fitting of the second rod segment surrounding the first rod segment, the cylinder end fitting including at least one locking groove; and
at least one lock segment installed into a segment opening;
wherein the at least one lock segment is configured to engage with the at least one locking groove when the first rod segment is moved to the locking position relative to the second rod segment when an unlock sleeve disposed radially inboard of the cylinder end fitting is not covering the locking groove.

2. The rod assembly of claim 1, wherein the locking apparatus comprises:
an outer sleeve surrounding the cylinder end fitting; and
the unlock sleeve;
wherein the unlock sleeve is configured to block the at least one locking groove to prevent engagement of the at least one lock segment into the at least one locking groove unless the first rod segment is in the extended position and the unlock groove is uncovered due to upward movement of unlock sleeve under spring force.

3. The rod assembly of claim 2, wherein the cylinder end fitting includes at least one ball installed thereto, the ball selectably engageable into a detent formed in the outer sleeve when the rod assembly is in the unlocked position.

4. The rod assembly of claim 3, wherein the ball is urged into engagement with the detent via a detent sleeve disposed radially inboard of the unlock sleeve.

5. The rod assembly of claim 2, wherein the outer sleeve is secured to the unlock sleeve via at least one dowel pin extending through at least one pin slot in the cylinder end fitting.

6. The rod assembly of claim 1, wherein the at least one lock segment includes a wear resistant insert installed thereto to prevent wear of the second rod segment.

7. The rod assembly of claim 1, wherein the at least one lock groove includes a dovetail shaped engagement surface at which a complimentary engagement tab of the lock segment is engageable.

8. A door and hold open rod assembly of an aircraft, comprising:
   a door; and
   a hold open rod assembly secured to the door, the hold open rod assembly configured to support the door in an opened position when the hold open rod is deployed, the hold open rod assembly including:
   a first rod segment extending along a rod central axis;
   a second rod segment surrounding the first rod segment and in a telescoping arrangement with the first rod segment; and
   a locking apparatus operably connected to the first rod segment and the second rod segment, the locking apparatus configured to automatically lock the first rod segment in an extended position relative to the second rod segment;
   wherein the locking apparatus comprises:
      a cylinder end fitting surrounding the first rod segment, the cylinder end fitting including at least one locking groove;
      at least one lock segment installed into the at least one locking groove in the cylinder end fitting, the at least one lock segment biased toward the at least one locking groove;
      an outer sleeve surrounding the cylinder end fitting; and
      an unlock sleeve disposed radially inboard of the cylinder end fitting;
   wherein the at least one lock segment is configured to engage with the at least one locking groove when the first rod segment is moved to the extended position relative to the second rod segment; and
   wherein the unlock sleeve is configured to block the at least one locking groove to prevent engagement of the at least one lock segment into the at least one locking groove unless the first rod segment is in the extended position.

9. The door and hold open rod assembly of claim 8, wherein the cylinder end fitting includes at least one ball installed thereto, the ball selectably engageable into a detent formed in the outer sleeve when the rod assembly is in the unlocked position.

10. The door and hold open rod assembly of claim 9, wherein the ball is urged into engagement with the detent via a detent sleeve disposed radially inboard of the unlock sleeve.

11. The door and hold open rod assembly of claim 8, wherein the outer sleeve is secured to the unlock sleeve via at least one dowel pin extending though at least one pin slot in the cylinder end fitting.

12. The door and hold open rod assembly of claim 8, wherein the at least one lock segment includes a wear resistant insert installed thereto to prevent wear of the second rod segment.

13. The door and hold open rod assembly of claim 8, wherein the at least one lock groove includes a dovetail shaped engagement surface at which a complimentary engagement tab of the lock segment is engageable.

14. An engine assembly of an aircraft, comprising:
   an engine body;
   a cowling configured to at least partially enclose the engine body, the cowling movable between a closed position and an opened position; and
   a hold open rod assembly secured to the cowling, the hold open rod assembly configured to support the cowling in an opened position when the hold open rod is deployed, the hold open rod assembly including
   a first rod segment extending along a rod central axis;
   a second rod segment surrounding the first rod segment and in a telescoping arrangement with the first rod segment; and
   a locking apparatus operably connected to the first rod segment and the second rod segment, the locking apparatus configured to automatically lock the first rod segment in an extended position relative to the second rod segment;
   wherein the locking apparatus comprises:
      a cylinder end fitting surrounding the first rod segment, the cylinder end fitting including at least one locking groove;
      at least one lock segment installed into the at least one locking groove in the cylinder end fitting, the at least one lock segment biased toward the at least one locking groove;
      an outer sleeve surrounding the cylinder end fitting; and
      an unlock sleeve disposed radially inboard of the cylinder end fitting;
   wherein the at least one lock segment is configured to engage with the at least one locking groove when the first rod segment is moved to the extended position relative to the second rod segment; and
   wherein the unlock sleeve is configured to block the at least one locking groove to prevent engagement of the at least one lock segment into the at least one locking groove unless the first rod segment is in the extended position.

15. The engine assembly of claim 14, wherein the cylinder end fitting includes at least one ball installed thereto, the ball selectably engageable into a detent formed in the outer sleeve when the rod assembly is in the unlocked position.

* * * * *